(12) United States Patent
Zhou et al.

(10) Patent No.: US 12,204,750 B2
(45) Date of Patent: Jan. 21, 2025

(54) METADATA MANAGEMENT FOR TRANSPARENT BLOCK LEVEL COMPRESSION

(71) Applicant: Lemon Inc., Grand Cayman (KY)

(72) Inventors: Ping Zhou, Los Angeles, CA (US); Chaohong Hu, Los Angeles, CA (US); Kan Frankie Fan, Los Angeles, CA (US); Fei Liu, Los Angeles, CA (US); Longxiao Li, Los Angeles, CA (US); Hui Zhang, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 0 days.

(21) Appl. No.: 17/953,242

(22) Filed: Sep. 26, 2022

(65) Prior Publication Data

US 2024/0103722 A1    Mar. 28, 2024

(51) Int. Cl.
*G06F 3/06* (2006.01)

(52) U.S. Cl.
CPC ............ *G06F 3/0608* (2013.01); *G06F 3/064* (2013.01); *G06F 3/0644* (2013.01); *G06F 3/0673* (2013.01)

(58) Field of Classification Search
CPC ...... G06F 3/0608; G06F 3/064; G06F 3/0644; G06F 3/0673
USPC ............................................. 710/68; 711/100
See application file for complete search history.

(56) References Cited

U.S. PATENT DOCUMENTS

| 10,664,403 | B1* | 5/2020 | Lai | G06F 12/0886 |
|---|---|---|---|---|
| 10,747,439 | B2* | 8/2020 | Garcia | G06F 11/1441 |
| 2015/0242309 | A1* | 8/2015 | Talagala | G06F 3/064 |
| | | | | 711/103 |
| 2017/0371793 | A1* | 12/2017 | Saidi | G06F 12/0895 |
| 2018/0060235 | A1* | 3/2018 | Yap | G06F 12/04 |
| 2019/0087275 | A1* | 3/2019 | Nakatsuka | G06F 3/0659 |
| 2023/0236979 | A1* | 7/2023 | Geng | G06F 12/084 |
| | | | | 711/118 |

* cited by examiner

*Primary Examiner* — Ilwoo Park
(74) *Attorney, Agent, or Firm* — BakerHostetler

(57) ABSTRACT

The present disclosure describes techniques of metadata management for transparent block level compression. A first area may be created in a backend solid state drive. The first area may comprise a plurality of entries. The plurality of entries may be indexed by addresses of a plurality of blocks of uncompressed data. Each of the plurality of entries comprises a first part configured to store metadata and a second part configured to store compressed data. Each of the plurality blocks of uncompressed data may be compressed individually to generate a plurality of compressed blocks. Metadata and at least a portion of compressed data associated with each of the plurality of compressed blocks may be stored in one of the plurality of entries based on an address of a corresponding block of uncompressed data. A second area may be created in the backend solid state drive for storing the rest of the compressed data.

18 Claims, 10 Drawing Sheets

500

Dividing a backend SSD into a first area and a second area, wherein the first area comprises a plurality of entries indexed by addresses of a plurality of blocks of uncompressed data, and wherein the second area is configured to store compressed data — 502

Allocate a predetermined address range of the backend SSD to the first area — 504

Prepare a plurality of entries in the first area, wherein the plurality of entries are indexed by addresses of a plurality of blocks of uncompressed data, and wherein each of the plurality of entries corresponds to a predetermined storage size — 506

FIG. 5

METADATA MANAGEMENT FOR TRANSPARENT BLOCK LEVEL COMPRESSION

BACKGROUND

Companies and/or individuals are increasingly utilizing and/or producing a large quantity of data. Such data may need to be stored in one or more local and/or remote locations. Improved techniques for data storage are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 5 shows another example process for metadata management for transparent block level compression in accordance with the present disclosure.

DETAILED DESCRIPTION OF ILLUSTRATIVE EMBODIMENTS

Instance storage is an Infrastructure-As-A-Service (IAAS) product offered by many Cloud Service Providers (CSPs). High performance storage devices on the server, such as nonvolatile memory express (NVMe) solid-state drives (SSDs), may be virtualized and partitioned into multiple virtual blocked devices. Such virtual blocked devices may be provided to users' virtual machine (VM) instances as their local storage. Because many NVMe SSDs do not offer NVMe virtualization (e.g., SR-MY) or multiple namespaces and supporting these features with software may be costly as it occupies CPU resources, some CSPs use a dedicated hardware (e.g., instance storage card) between the host (e.g., server) and the NVMe SSDs.

Figure 1:
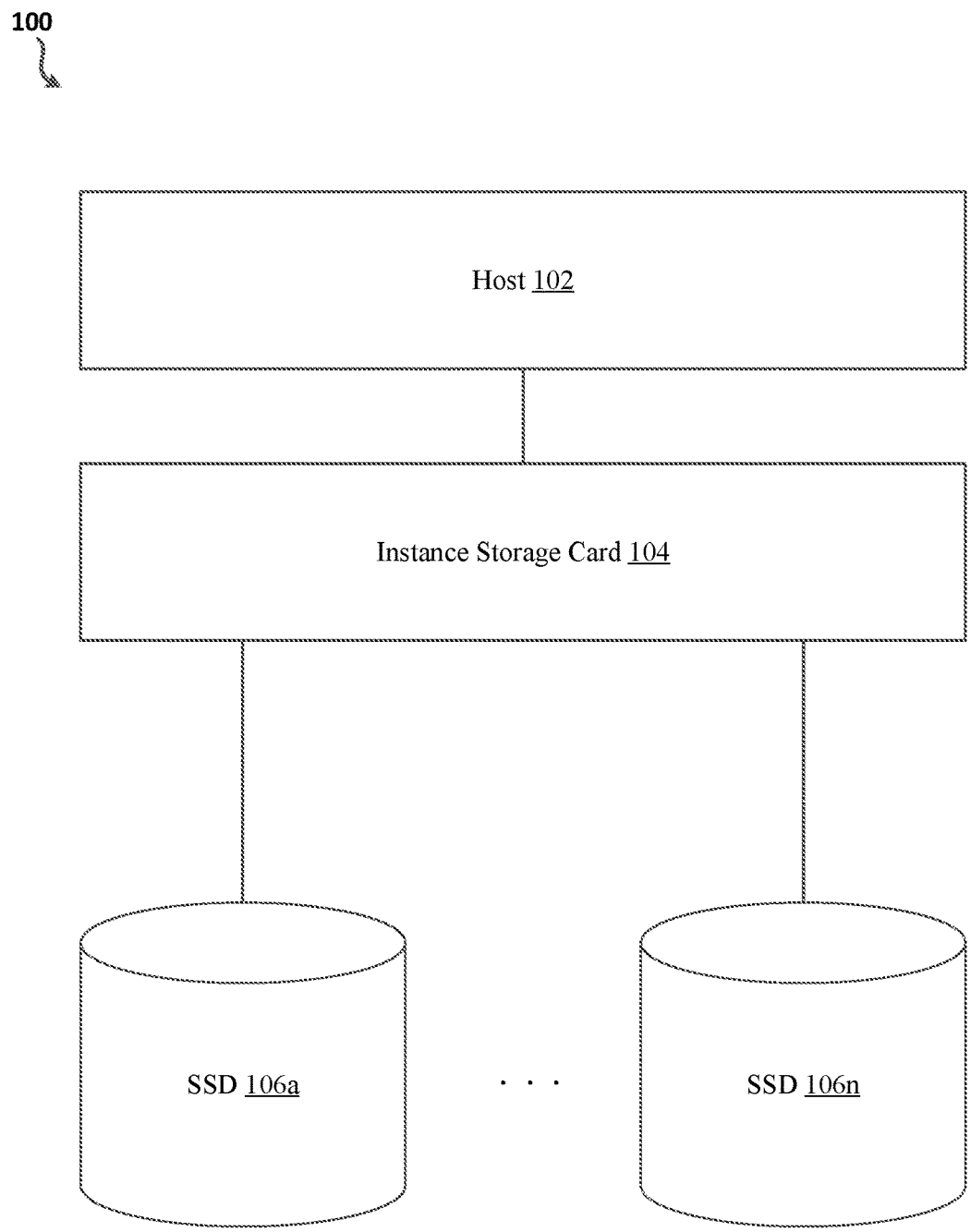
FIG. 1 shows an example prior art framework for data storage.

FIG. 1 shows an example prior art framework 100 for data storage. The framework 100 includes a host 102 (e.g., server), an instance storage card 104, and a plurality of SSDs 106a-n. The host 102 may, for example, be a cloud server. The instance storage card 104 may be between the server 102 and the plurality of SSDs 106a-n. The instance storage card 104 may provide a standard block device interface to the host 102, such as to the NVMe on the host 102, just like many common storage devices. The instance storage card 104 may offload many jobs, such as storage virtualization, the management of multiple namespaces (partitioning), I/O routing, address mapping, etc.

However, one feature that has been desirable but long missing for instance storage card (and also for generic block device users) is transparent block device level compression. Compression algorithms reduce the redundancy in data representation thus increasing effective data density. Data compression may reduce the size of data and allow for storing the same amount of data in relatively fewer bits, thus resulting in reducing the data storage space, resource usage or transmission capacity. In transparent block device level compression, data compression may be done at the block device level and may be transparent to the host. Thus, no software change is needed on the host side. Depending on the workloads on the host, the amount of data can be significantly reduced after compression, thus reducing the cost of storage on the server.

However, transparent block device level compression is difficult to implement due to the difficulty of managing metadata of the compressed block. Compressed block data has variable lengths. Thus, a non-linear mapping exists between compressed addresses (e.g., the addresses on the SSDs) and the uncompressed addresses (e.g., the addresses presented to the host). The mapping table between compressed and uncompressed addresses (e.g., the compression mapping table ("compression mapping table")) may be large in size and may not fit in memory. For example, assuming each 4 KB uncompressed address uses a 64-bit mapping entry, the compression mapping table for 32 TB storage is 64 GB in size. The compression mapping table may thus be too costly to fit in hardware and/or on the host. The compression mapping table includes critical metadata. Thus, the compression mapping table must be persistently reliable, even in the event of a power loss. Any corruption or inconsistency in the compression mapping table may cause loss of user data. However, given its huge size, it is very challenging to ensure consistency and provide power loss protection for the compression mapping table.

Management of metadata of the compressed block device may also be difficult due to the frequent need to update metadata. While metadata are usually small in size, they are updated very frequently, such as along with every write. Such frequent updates may be unfriendly and expensive, as they cause a large write amplification. For example, the smallest access unit for a common storage device is 512 B and updating an 8 B mapping table entry requires a read-modify-write of 512 B, resulting in 64 write amplifications. Such a large write amplification not only impacts performance, but also wears out storage much faster. Thus, techniques for the management of metadata for transparent block level compression are desirable.

Described herein are techniques for solving the above-described challenges of managing metadata for transparent block device level compression. As a result, the techniques described herein may make transparent block device compression feasible in production. According to the techniques described herein, uncompressed user data may be handled in units of blocks. For example, a typical block size may be 4 KB for NVMe SSD. Each uncompressed 4 KB block may be compressed individually. The compression mapping table may be stored on the backend SSD, just like compressed data. In this manner, the techniques described herein may leverage the power-loss protection that is already available on the SSD. The techniques described herein may, in certain embodiments, be applied to an instance storage (e.g., instance storage card).

The entries in the compression mapping table described herein may be structured in such a way that each entry matches the smallest access unit of common SSDs (e.g., 512 bytes). The compression mapping table may be indexed by the uncompressed block address (e.g., 4 KB LBA) from the host. Each entry may contain a few bytes of mapping information (e.g., start address, length), with the rest available for compressed data. The backend SSD, when initialized, may be divided into two areas: the compression mapping table area and the data area. The compression mapping table area may be allocated in a fixed address range (e.g., the first few GBs) that is known to both hardware and software. For each compressed block, part of its data may be stored in its compression mapping table entry along with its mapping information, and any remaining portion of the compressed data may be stored in the data area.

Figure 2:
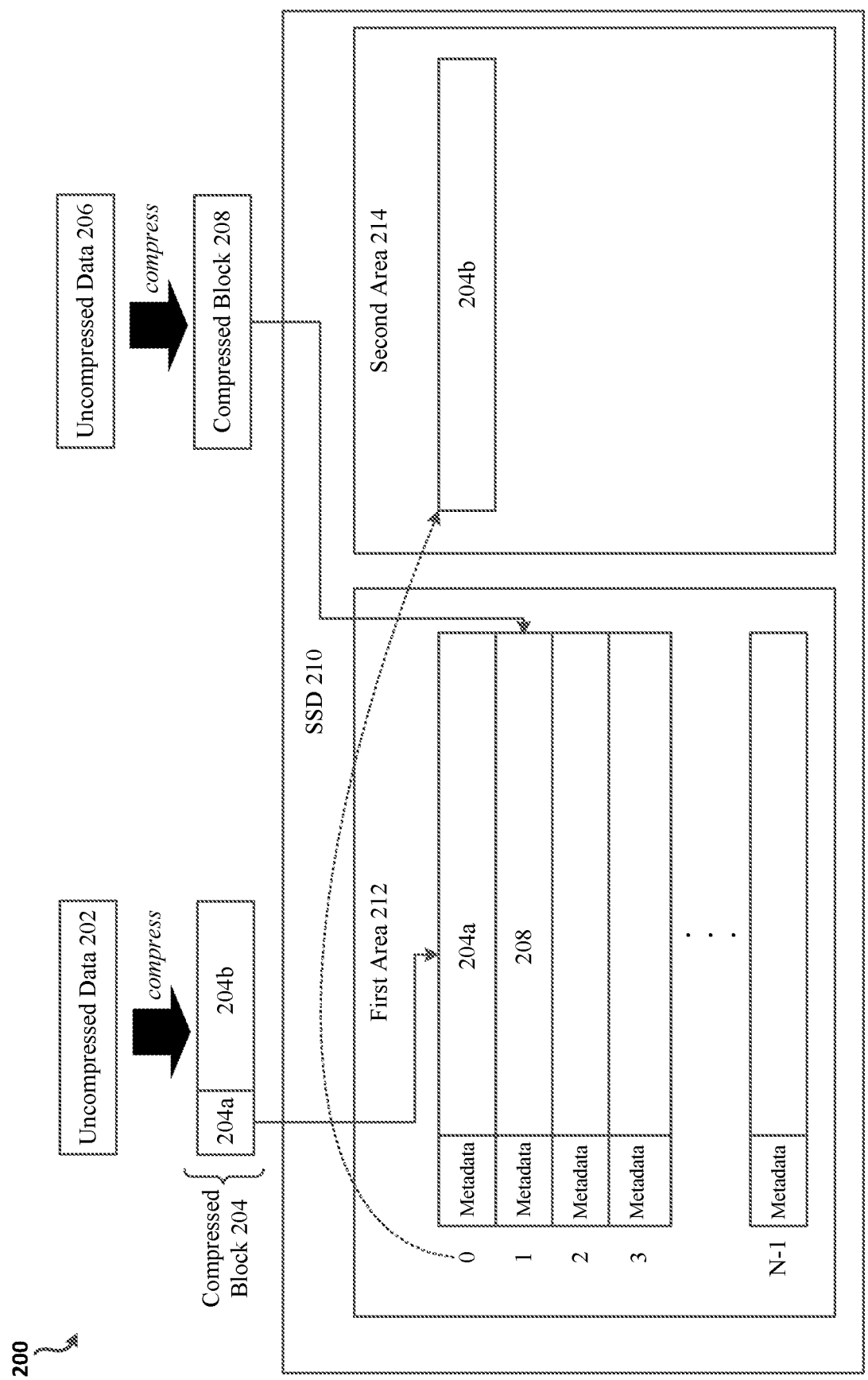
FIG. 2 shows an example framework for metadata management for transparent block level compression in accordance with the present disclosure.

FIG. 2 illustrates an example framework 200 for managing metadata for transparent block device level compression. The framework 200 comprises a backend SSD 210. The backend SSD 210 may comprise a first area 212 and a second area 214. For example, the backend SSD 210 may, when initialized, be divided into two areas: the first area 212 and the second area 214. The first area 212 may be configured to store a compression mapping table. For example, the compression mapping table may be stored on the backend SSD 210, just like compressed data. In this way, the power-loss protection that is already available on the backend SSD 210 may be leveraged. The second area 214 may be configured to store compressed data and is different from the first area 212.

The compression mapping table may comprise a plurality of entries. Each of the plurality of entries may be aligned with the smallest access unit of SSDs. For example, each of the plurality of entries may be 512 bytes. The plurality of entries may be indexed by addresses associated with a plurality of corresponding blocks of uncompressed data. Indexing by the uncompressed block address may lead to simplicity (e.g., low complexity) in the framework 200. Each of the plurality of entries may comprise two parts: a first part configured to store metadata and a second part configured to store compressed data. For example, the first part (e.g., the first few bytes) may be configured to store mapping information. The mapping information may include a start address and/or length. The second part (e.g., the rest of the 512 bytes) may be configured to store at least a portion of the compressed data. If the backend SSD 210 supports metadata (e.g., 8B PI per 512 bytes), this metadata area may be used to store mapping information. In this case, the entire 512 bytes may be used for storing compressed data.

Uncompressed user data may be handled in units of blocks. For example, a typical block size may be 4 KB for NVMe SSD. Each uncompressed data block, such as uncompressed data block 202 and uncompressed data block 206, may be compressed individually. For example, the uncompressed data block 202 may be compressed to generate a compressed block 204. Likewise, the uncompressed block 206 may be compressed to generate a compressed block 208.

In embodiments, any particular compressed block may be split into two parts. For example, the compressed block 204 may be split into a first part 204a and a second part 204b. The first part 204a may be stored in the first area 212, such as in the corresponding compression mapping table entry, along with its metadata (e.g., mapping information). For example, as shown in FIG. 2, the first part 204a may be stored in the entry indexed as zero, along with the corresponding mapping information. The first part 204a may, for example, have a size of approximately 500 bytes, depending on how many bytes are used by the corresponding mapping information. The rest of the compressed block 204, (e.g., the second part 204b) may be stored in an allocated space in the second area 214. The address of the second part 204b in the allocated space in the second area 214 may be tracked by the metadata (e.g., mapping information) in the compression mapping table entry corresponding to the compressed block 204.

In embodiments, any particular compressed block may be small enough to fit entirely in the corresponding compression mapping table entry. For example, a compressed block may have a size smaller than or equal to 512 bytes. In the example of FIG. 2, the compressed block 208 may be small enough to fit entirely in the compression mapping table entry indexed as one, along with the corresponding mapping information. Thus, the compressed block 208 may not have any space allocated to it in the second area 214. If the entire compressed block 208 fits in the compression mapping table entry, a special value may be stored in the mapping information to indicate that the entire compressed block 208 fits in the compression mapping table entry.

In embodiments, a read request may be received from a host (e.g., server). The read request may be received at the backend SSD 210. The read request may include an address of a block of uncompressed data. The corresponding entry in the compression mapping table may be determined (e.g., looked up) using the address of the block of uncompressed data. It may be determined if the entire compressed block fits in the corresponding entry. For example, it may be determined if a special value is stored in the mapping information to indicate that the entire compressed block fits in the compression mapping table entry. If it is determined that the entire compressed block fits in the corresponding entry, this may indicate that both metadata and compressed data can be accessed in one I/O. This will result in better performance of workloads with more compressible data. If it is determined that the entire compressed block fits in the corresponding entry, the entire compressed block may be decompressed directly, and the decompressed data may be returned to the host. An indication that the read request is complete may also be returned to the host.

Conversely, if it is determined that the entire compressed block does not fit in the corresponding entry, then the rest of the compressed block may be read from the second area 214 of the backend SSD 210. For example, the rest of the compressed block may be read from the second area 214 using the address indicated by the mapping information. The compressed block may be decompressed, and the decompressed data may be returned to the host. An indication that the read request is complete may also be returned to the host.

In embodiments, a write request may be received from a host (e.g., server). The write request may be received at the backend SSD 210. The write request may include a block of uncompressed data and an address of the block of uncompressed data. The block of uncompressed data may be compressed to generate a corresponding compressed block. The corresponding entry in the compression mapping table may be determined (e.g., looked up) using the address of the block of uncompressed data. It may be determined if the entire compressed block can fit in the corresponding entry. For example, it may be determined if the entire compressed block has a size less than or equal to 512 bytes. If it is determined that the entire compressed block can fit in the corresponding entry, the compressed block may be written directly to the backend SSD 210 with one I/O. An indication that the write request is complete may be returned to the host.

Conversely, if it is determined that the entire compressed block cannot fit in the corresponding entry, then space for the rest of the compressed block may be allocated in the second area 214 of the backend SSD 210. The compression mapping table entry may be prepared. For example, the metadata (e.g., mapping information) and the first part of the compressed block may be prepared. The rest of the compressed block (e.g., the second part of the compressed block) may be written in the space allocated for the rest of the compressed block in the second area 214 of the backend SSD 210. The compression mapping table entry may be written. An indication that the write request is complete may be returned to the host. This technique avoids write amplification. For example, when metadata is written, at least part of the compressed data is also written as part of the write. There is thus no read-modify-write, as all 512 bytes being written are utilized. Accordingly, there is no write amplification.

The above-described techniques leverage the power-loss protection capability of the backend SSD 210 for storing metadata and compressed data. For a host write request, completion may not be returned to the host until both metadata and the compressed block are written to the backend SSD 210. If any power loss occurs during the write before compressed data is written, then no update happens on the backend SSD 210. If any power loss occurs during the write after compressed data is written but before compression mapping table entry is written, then the compressed data on the backend SSD 210 may not be mapped. Instead, the compressed data on the backend SSD 210 may be regarded as free space after recovery. In either case, the host may not receive an indication of completion and may regard the last write as not completed. Thus, the data may remain consistent.

Figure 3:
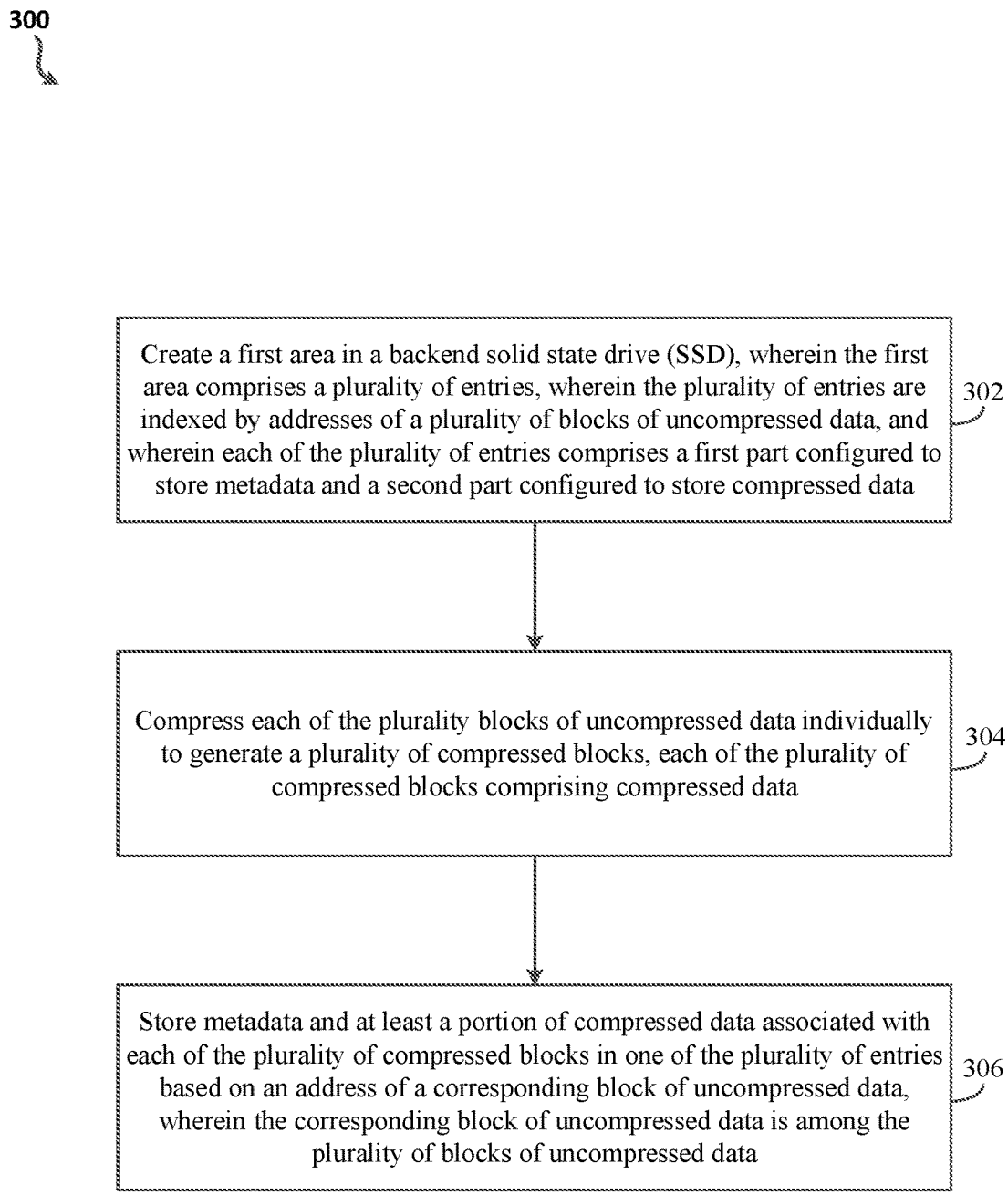
FIG. 3 shows an example process for metadata management for transparent block level compression in accordance with the present disclosure.

FIG. 3 illustrates an example process 300. The process 300 may be performed to manage metadata for transparent block device level compression. The process 300 may be performed by one or more components of the framework 200 depicted in FIG. 2. In embodiments, the process 300 may be applied to an instance storage (e.g., instance storage card). Although depicted as a sequence of operations in FIG. 3, those of ordinary skill in the art will appreciate that various embodiments may add, remove, reorder, or modify the depicted operations.

A backend SSD may comprise a first area. At 302, a first area in a backend SSD may be created. The first area may comprise a plurality of entries. For example, the first area may be configured to store a compression mapping table comprising a plurality of entries. Each of the plurality of entries may be aligned with the smallest access unit of SSDs. The plurality of entries may be indexed by addresses of a plurality of blocks of uncompressed data. Indexing by the uncompressed block address may lead to simplicity (e.g., low complexity) in the framework. Each of the plurality of entries may comprise two parts: a first part configured to store metadata and a second part configured to store compressed data. For example, the first part (e.g., the first few bytes) may be configured to store mapping information. The mapping information may include a start address and/or length. The second part (e.g., the rest of the bytes) may be configured to store at least a portion of the compressed data.

Uncompressed user data may be handled in units of blocks. For example, a typical block size may be 4 KB for NVMe SSD. Each uncompressed data block may be compressed individually. At 304, each of the plurality blocks of uncompressed data may be compressed individually to generate a plurality of compressed blocks. Each of the plurality of compressed blocks may, for example, comprise compressed data.

At 306, metadata and at least a portion of compressed data associated with each of the plurality of compressed blocks may be stored in one of the plurality of entries. The metadata may comprise, for example, mapping information (e.g., start address, length). The metadata and at least a portion of compressed data associated with each of the plurality of compressed blocks may be stored based on an address of a corresponding block of uncompressed data. For example, each of the plurality of compressed blocks may be stored based on the addresses by which the plurality of blocks of uncompressed data are indexed in the compression mapping table. The corresponding block of uncompressed data may be among the plurality of blocks of uncompressed data.

Figure 4:
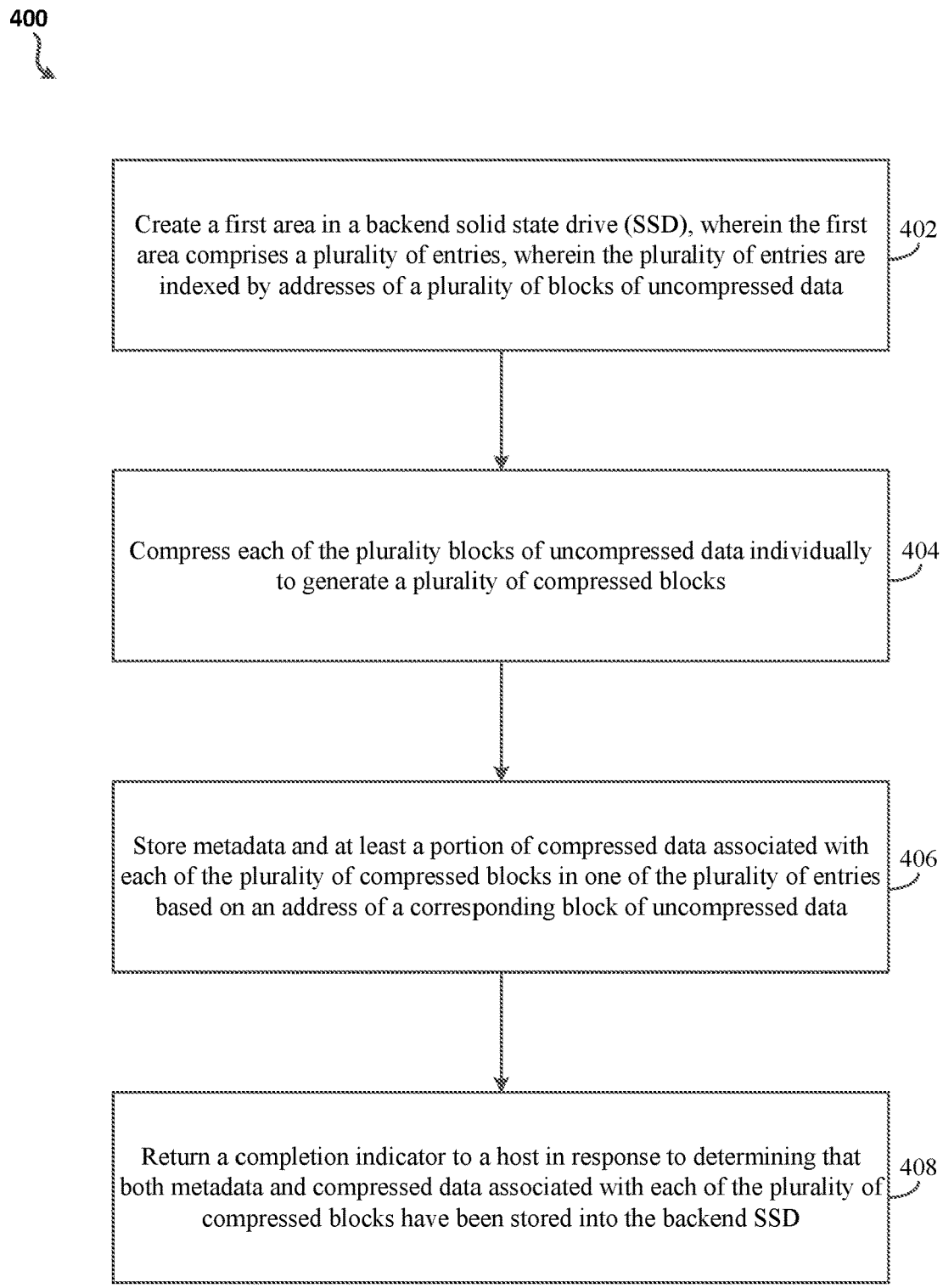
FIG. 4 shows another example process for metadata management for transparent block level compression in accordance with the present disclosure.

FIG. 4 illustrates an example process 400. The process 400 may be performed to manage metadata for transparent block device level compression. The process 400 may be performed by one or more components of the framework 200 depicted in FIG. 2. In embodiments, the process 400 may be applied to an instance storage (e.g., instance storage card). Although depicted as a sequence of operations in FIG. 4, those of ordinary skill in the art will appreciate that various embodiments may add, remove, reorder, or modify the depicted operations.

A backend SSD may comprise a first area. At 402, a first area in a backend SSD may be created. The first area may comprise a plurality of entries. For example, the first area may be configured to store a compression mapping table comprising a plurality of entries. Each of the plurality of entries may be aligned with the smallest access unit of SSDs. The plurality of entries may be indexed by addresses of a plurality of blocks of uncompressed data. Indexing by the uncompressed block address may lead to simplicity (e.g., low complexity) in the framework. Each of the plurality of entries may comprise two parts: a first part configured to store metadata and a second part configured to store compressed data. For example, the first part (e.g., the first few bytes) may be configured to store mapping information. The mapping information may include a start address and/or length. The second part (e.g., the rest of the bytes) may be configured to store at least a portion of the compressed data.

Uncompressed user data may be handled in units of blocks. For example, a typical block size may be 4 KB for NVMe SSD. Each uncompressed data block may be compressed individually. At 404, each of the plurality blocks of uncompressed data may be compressed individually to generate a plurality of compressed blocks. Each of the plurality of compressed blocks may, for example, comprise compressed data.

At 406, metadata and at least a portion of compressed data associated with each of the plurality of compressed blocks may be stored in one of the plurality of entries. The metadata may comprise, for example, mapping information (e.g., start address, length). The metadata and at least a portion of compressed data associated with each of the plurality of compressed blocks may be stored based on an address of a corresponding block of uncompressed data. For example, each of the plurality of compressed blocks may be stored based on the addresses by which the plurality of blocks of uncompressed data are indexed in the compression mapping table. The corresponding block of uncompressed data may be among the plurality of blocks of uncompressed data.

At 408, a completion indicator may be returned to a host in response to determining that both the metadata and the compressed data associated with each of the plurality of compressed blocks have been stored into the backend SSD. The completion indicator may not be returned to the host until both metadata and the compressed block are written to the backend SSD. If any power loss occurs during the write before compressed data is written, then no update happens on the backend SSD. If any power loss occurs during the write after compressed data is written but before compression mapping table entry is written, then the compressed data on the backend SSD may not be mapped. Instead, the compressed data on the backend SSD may be regarded as free space after recovery. In either case, the host may not receive an indication of completion and may regard the last write as not completed. Thus, the data may remain consistent.

FIG. 5 illustrates an example process 500. The process 500 may be performed to manage metadata for transparent block device level compression. The process 500 may be performed by one or more components of the framework 200 depicted in FIG. 2. In embodiments, the process 500 may be applied to an instance storage (e.g., instance storage card). Although depicted as a sequence of operations in FIG. 5, those of ordinary skill in the art will appreciate that various embodiments may add, remove, reorder, or modify the depicted operations.

A backend SSD may comprise a first area and a second area. At 502, a backend SSD may be divided into a first area and a second area. For example, the backend SSD may, when initialized, be divided into the first area and the second area. The first area may comprise a plurality of entries indexed by addresses of a plurality of blocks of uncompressed data. For example, the first area may be configured to store a compression mapping table. The compression mapping table may comprise the plurality of entries. Each of the plurality of entries may be aligned with the smallest access unit of SSDs. For example, each of the plurality of entries may be 512 bytes. The plurality of entries may be indexed by addresses associated with a plurality of corresponding blocks of uncompressed data. Each of the plurality of entries may comprise two parts: a first part configured to store metadata and a second part configured to store compressed data. For example, the first part (e.g., the first few bytes) may be configured to store mapping information. The mapping information may include a start address and/or length. The second part (e.g., the rest of the 512 bytes) may be configured to store at least a portion of the compressed data. The second area may be configured to store compressed data and may be different from the first area. At 504, a predetermined address range of the backend SSD may be allocated to the first area. For example, the first area may be allocated in a fixed address range (e.g., the first few GBs) that is known to both hardware and software.

At 506, a plurality of entries may be prepared in the first area. Each of the plurality of entries may be aligned with the smallest access unit of SSDs. The plurality of entries may be indexed by addresses of a plurality of blocks of uncompressed data. Indexing by the uncompressed block address may lead to simplicity (e.g., low complexity) in the framework. Each of the plurality of entries may comprise two parts: a first part configured to store metadata and a second part configured to store compressed data. For example, the first part (e.g., the first few bytes) may be configured to store mapping information. The mapping information may include a start address and/or length. The second part (e.g., the rest of the bytes) may be configured to store at least a portion of the compressed data. Each of the plurality of entries corresponds to a predetermined storage size. For example, each of the plurality of entries may have a storage size of 512 bytes.

Figure 6:
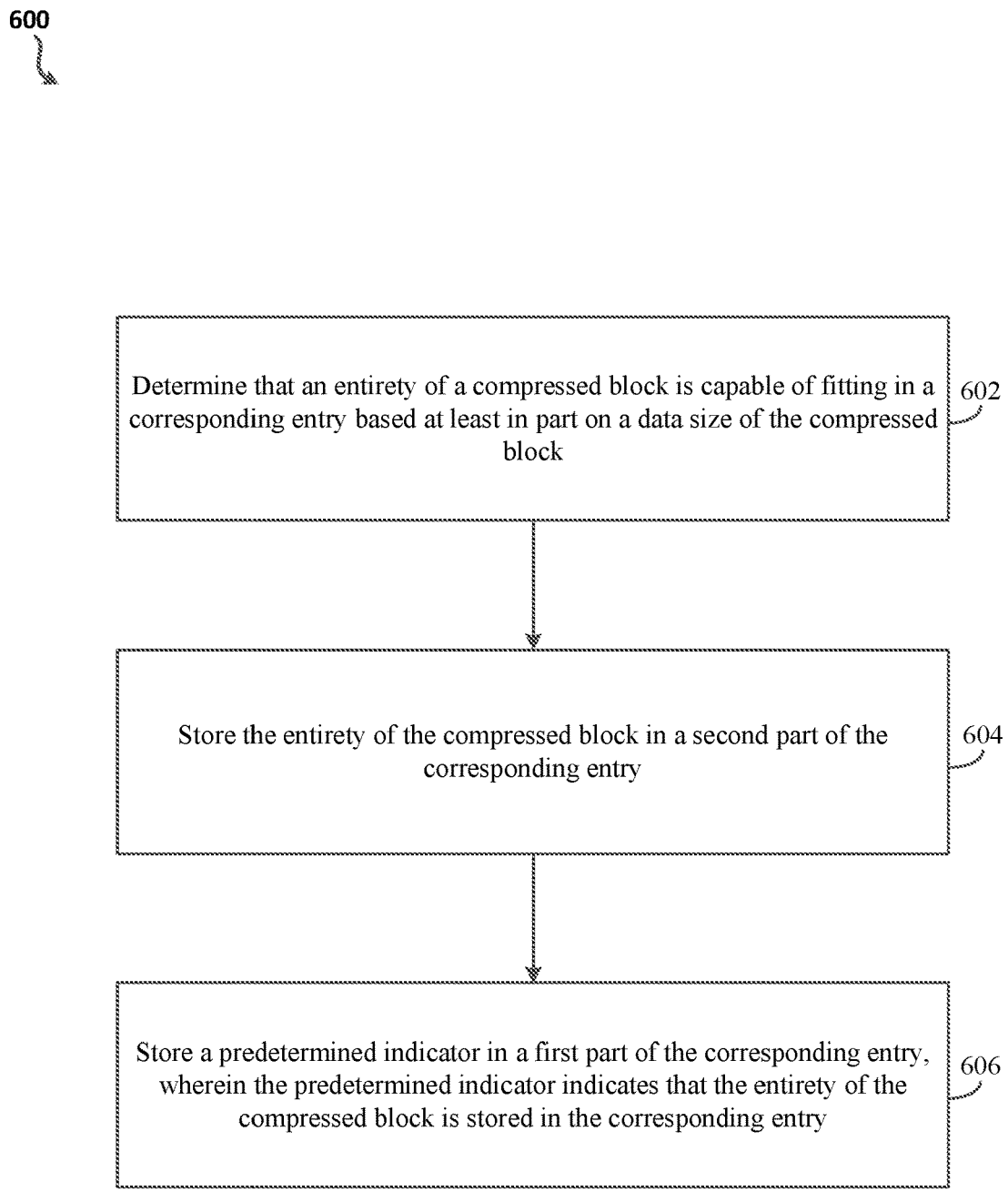
FIG. 6 shows another example process for metadata management for transparent block level compression in accordance with the present disclosure.

FIG. 6 illustrates an example process 600. The process 600 may be performed to manage metadata for transparent block device level compression. The process 600 may be performed by one or more components of the framework 200 depicted in FIG. 2. In embodiments, the process 600 may be applied to an instance storage (e.g., instance storage card). Although depicted as a sequence of operations in FIG. 6, those of ordinary skill in the art will appreciate that various embodiments may add, remove, reorder, or modify the depicted operations.

In embodiments, any particular compressed block may be small enough to fit entirely in the corresponding compression mapping table entry. At 602, it may be determined that an entirety of a compressed block is capable of fitting in a corresponding entry based at least in part on a data size of the compressed block. For example, the entire compressed block may have a size smaller than or equal to 512 bytes. Metadata (e.g., mapping information) associated with the compressed block may be stored in a first part of the corresponding entry. At 604, the entirety of the compressed block may be stored in a second part of the corresponding entry. Thus, the compressed block may not have any space allocated to it in a second area of the backend SSD.

If the entire compressed block fits in the corresponding entry, a special value may be stored in the mapping information to indicate that the entire compressed block fits in the entry. At 606, a predetermined indicator may be stored in the first part of the corresponding entry. The predetermined indicator may, for example, indicate that the entirety of the compressed block is stored in the corresponding entry (e.g., that the compressed block does not have any space allocated to it in a second area of the backend SSD).

Figure 7:
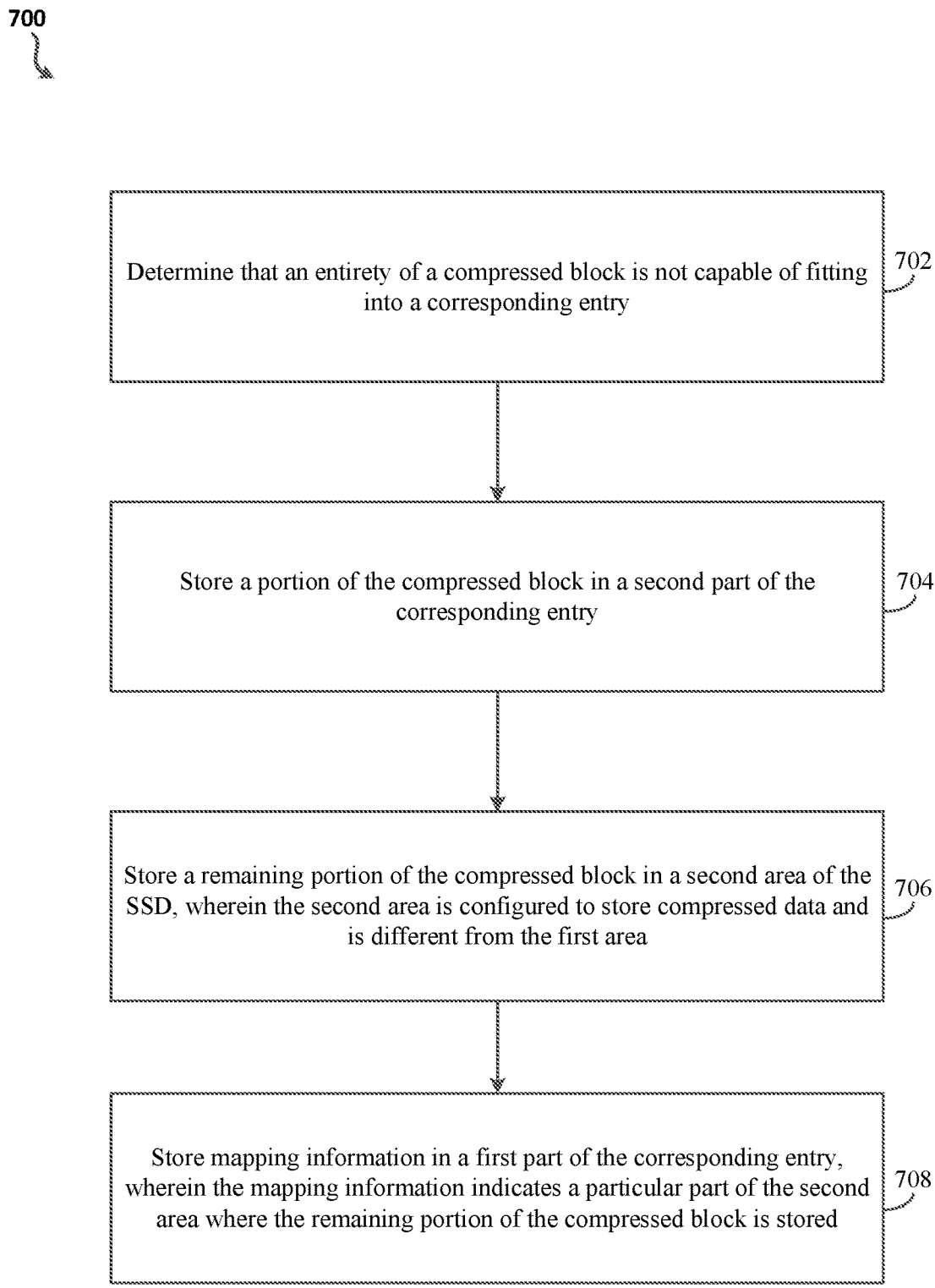
FIG. 7 shows another example process for metadata management for transparent block level compression in accordance with the present disclosure.

FIG. 7 illustrates an example process 700. The process 700 may be performed to manage metadata for transparent block device level compression. The process 700 may be performed by one or more components of the framework 200 depicted in FIG. 2. In embodiments, the process 700 may be applied to an instance storage (e.g., instance storage card). Although depicted as a sequence of operations in FIG. 7, those of ordinary skill in the art will appreciate that various embodiments may add, remove, reorder, or modify the depicted operations.

In embodiments, any particular compressed block may be split into two parts (e.g., portions). For example, a compressed block may be split into a first portion and a second portion. At 702, it may be determined that an entirety of the compressed block is not capable of fitting into a corresponding entry. The corresponding entry may, for example, be an entry among a plurality of entries in a compression mapping table. The compression mapping table may be stored in a first area of a backend SSD. The plurality of entries may be indexed by addresses of a plurality of blocks of uncompressed data. Each of the plurality of entries may be aligned with the smallest access unit of SSDs. For example, each of the plurality of entries may be 512 bytes. Each of the plurality of entries may comprise two parts: a first part configured to store metadata and a second part configured to store compressed data. For example, the first part (e.g., the first few bytes) may be configured to store mapping information. The mapping information may include a start address and/or length. The second part (e.g., the rest of the 512 bytes) may be configured to store at least a portion of the compressed data. For example, it may be determined that the entirety of the compressed block is not capable of fitting into the second part of the entry.

At 704, a portion (e.g., the first portion) of the compressed block may be stored in the second part of the corresponding entry. For example, the portion of the compressed block may be stored in the first area of the backend SSD along with its metadata (e.g., mapping information). The first portion of the compressed block may, for example, have a size of approximately 500 bytes, depending on how many bytes are used by the corresponding mapping information. The remaining portion of the compressed block, (e.g., the second portion) may be stored in an allocated space in the second area of the backend SSD. The address of the second portion in the allocated space in the second area may be tracked by metadata (e.g., mapping information) in the first part of the corresponding entry. At 706, a remaining portion of the compressed block may be stored in the second area of the SSD. At 708, mapping information may be stored in the first part of the corresponding entry. The mapping information may indicate, for example, a particular part of the second area of the backend SSD where the remaining portion of the compressed block is stored.

Figure 8:
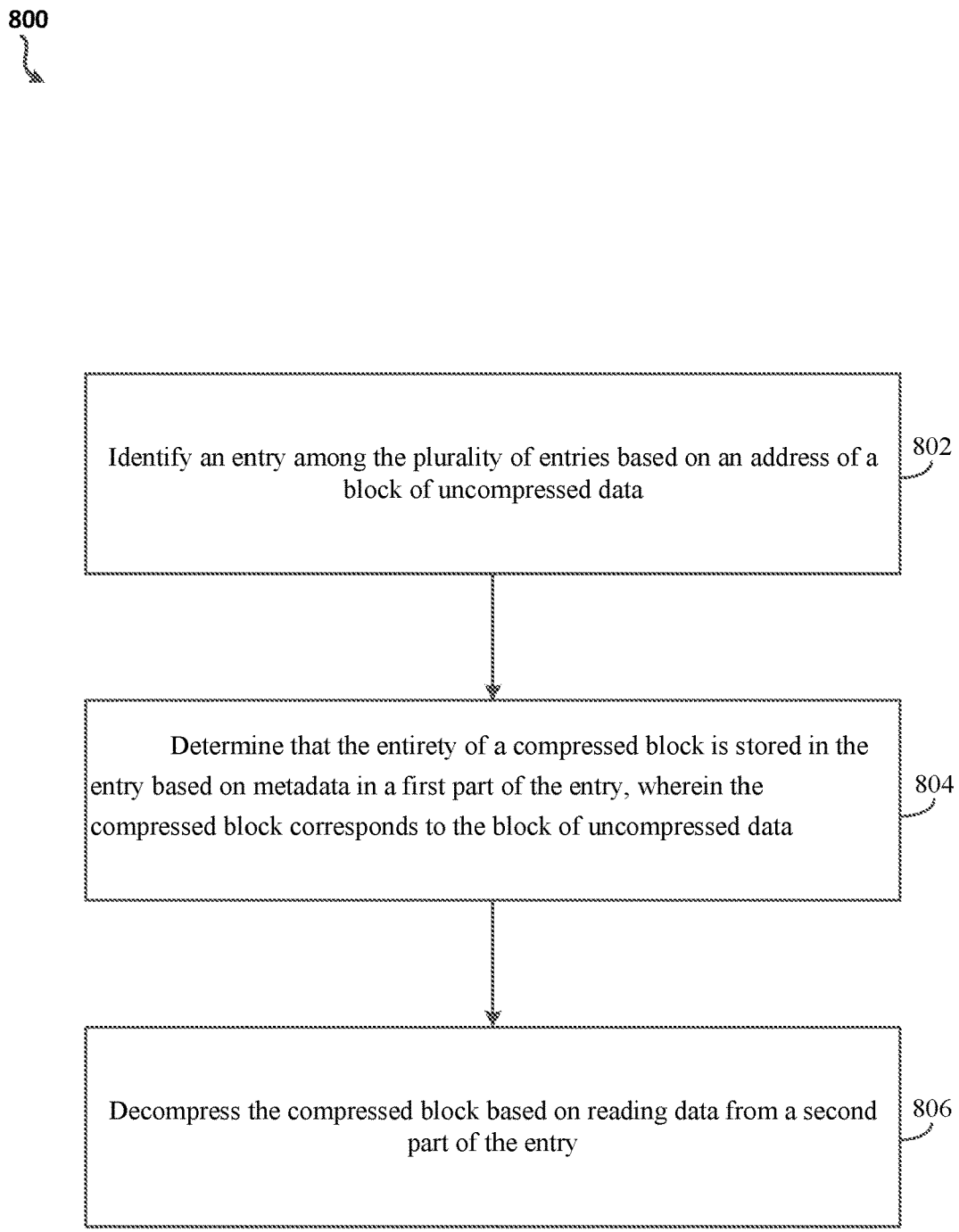
FIG. 8 shows another example process for metadata management for transparent block level compression in accordance with the present disclosure.

FIG. 8 illustrates an example process 800. The process 800 may be performed to manage metadata for transparent block device level compression. The process 800 may be performed by one or more components of the framework 200 depicted in FIG. 2. In embodiments, the process 800 may be applied to an instance storage (e.g., instance storage card). Although depicted as a sequence of operations in FIG. 8, those of ordinary skill in the art will appreciate that various embodiments may add, remove, reorder, or modify the depicted operations.

A compression mapping table may be stored in a first area of a backend SSD. The compression mapping table may comprise a plurality of entries. Each of the plurality of entries may be aligned with the smallest access unit of SSDs. For example, each of the plurality of entries may be 512 bytes. Each of the plurality of entries may comprise two parts: a first part configured to store metadata and a second part configured to store compressed data. For example, the first part (e.g., the first few bytes) may be configured to store mapping information. The mapping information may include a start address and/or length. The second part (e.g., the rest of the 512 bytes) may be configured to store at least a portion of the compressed data.

A read request may be received from a host (e.g., server). The read request may be received at the backend SSD. At 802, an entry among the plurality of entries may be identified. The entry may be identified based on an address of a block of uncompressed data. For example, the read request may include the address of a block of uncompressed data. The entry in a compression mapping table corresponding to the block of uncompressed data may be determined (e.g., looked up) using the address of the block of uncompressed data.

It may be determined if an entire compressed block corresponding to the block of uncompressed data fits in the corresponding entry. For example, it may be determined if the entire compressed block has a size that is less than 512 bytes (e.g., able to fit in the second part of the entry). At 804, it may be determined that the entirety of a compressed block is stored in the entry. For example, it may be determined that the entirety of the compressed block can fit in the second part of the entry. The compressed block may correspond to the block of uncompressed data. It may be determined that the entirety of the compressed block is stored in the entry based on metadata stored in a first part of the entry. For example, it may be determined if a special value is stored in the metadata (e.g., mapping) information to indicate that the entire compressed block fits in the compression mapping table entry.

If it is determined that the entire compressed block fits in the corresponding entry, this may indicate that both metadata and compressed data can be accessed in one I/O. This will result in better performance of workloads with more compressible data. If it is determined that the entire compressed block fits in the corresponding entry, the entire compressed block may be decompressed directly. At 806, the entire compressed block may be decompressed based on reading data from a second part of the entry. The decompressed data may be returned to the host. An indication that the read request is complete may also be returned to the host.

Figure 9:
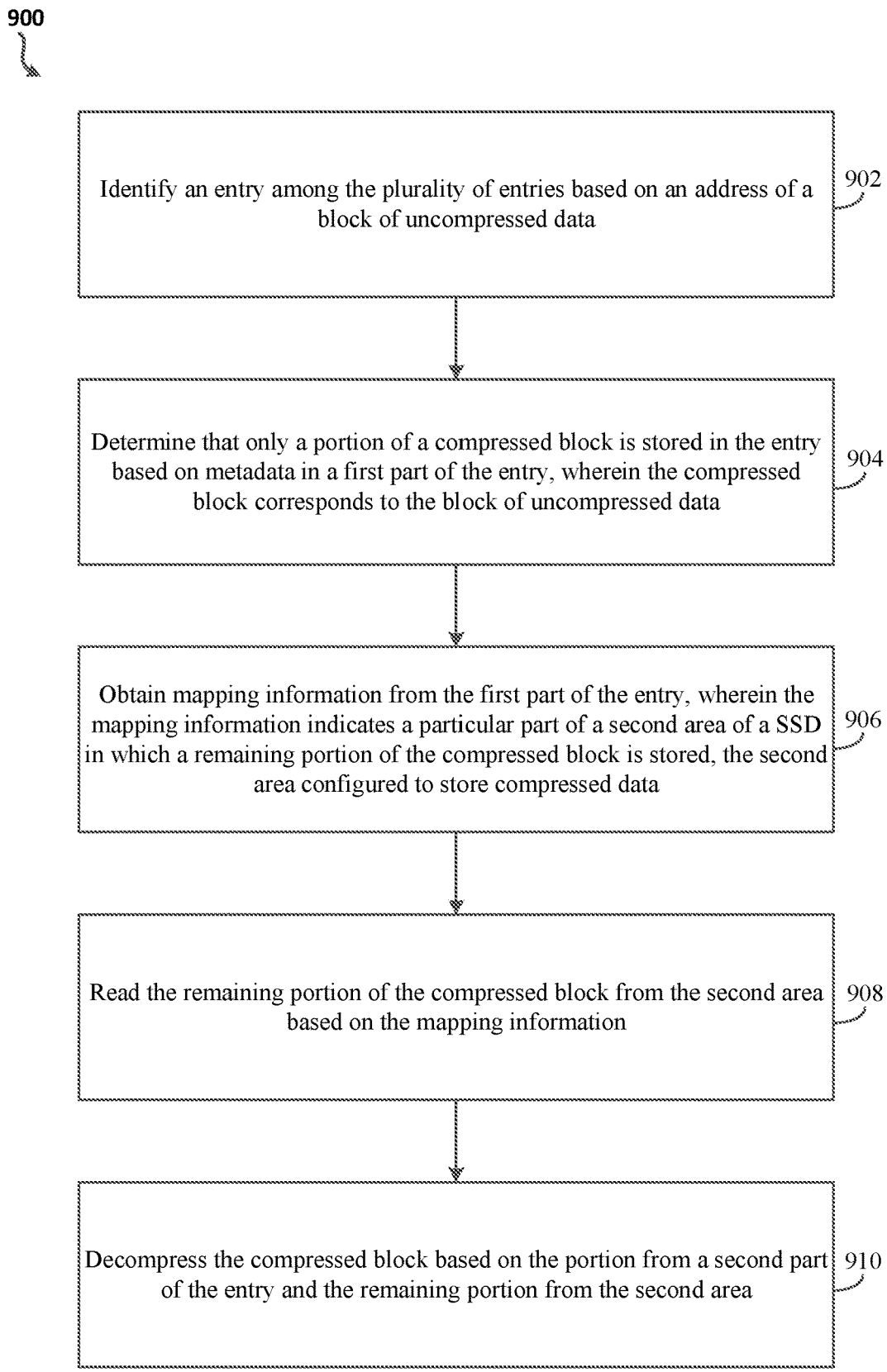
FIG. 9 shows another example process for metadata management for transparent block level compression in accordance with the present disclosure.

FIG. 9 illustrates an example process 900. The process 900 may be performed to manage metadata for transparent block device level compression. The process 900 may be performed by one or more components of the framework 200 depicted in FIG. 2. In embodiments, the process 900 may be applied to an instance storage (e.g., instance storage card). Although depicted as a sequence of operations in FIG. 9, those of ordinary skill in the art will appreciate that various embodiments may add, remove, reorder, or modify the depicted operations.

A compression mapping table may be stored in a first area of a backend SSD. The compression mapping table may comprise a plurality of entries. Each of the plurality of entries may be aligned with the smallest access unit of SSDs. For example, each of the plurality of entries may be 512 bytes. Each of the plurality of entries may comprise two parts: a first part configured to store metadata and a second part configured to store compressed data. For example, the first part (e.g., the first few bytes) may be configured to store mapping information. The mapping information may include a start address and/or length. The second part (e.g., the rest of the 512 bytes) may be configured to store at least a portion of the compressed data.

A read request may be received from a host (e.g., server). The read request may be received at the backend SSD. At 902, an entry among the plurality of entries may be identified. The entry may be identified based on an address of a block of uncompressed data. For example, the read request may include the address of a block of uncompressed data. The entry in a compression mapping table corresponding to the block of uncompressed data may be determined (e.g., looked up) using the address of the block of uncompressed data.

It may be determined if the entire compressed block corresponding to the block of uncompressed data fits in the corresponding entry fits in the corresponding entry. At 904, it may be determined that only a portion of the compressed block is capable of being stored in the entry. The compressed block may correspond to the block of uncompressed data. For example, it may be determined that the entirety of the compressed block is not stored in the entry based on metadata stored in a first part of the entry. Determining that the entirety of the compressed block is not stored in the entry may comprise determining that a special value is not stored in the metadata (e.g., mapping) information to indicate that the entire compressed block fits in the compression mapping table entry.

At 906, mapping information from the first part of the entry may be obtained. The mapping information may indicate a particular part of the second area of a backend SSD in which a remaining portion of the compressed block is stored. At 908, the remaining portion of the compressed block may be read from the second area. For example, the remaining portion of the compressed block may be read from the second area based on the mapping information obtained from the first part of the entry. At 910, the compressed block may be decompressed. For example, the compressed block may be decompressed based on the portion of the compressed data block stored in a second part of the entry and based on the remaining portion stored in the second area of the backend SSD. The decompressed data may be returned to the host. An indication that the read request is complete may also be returned to the host.

Figure 10:
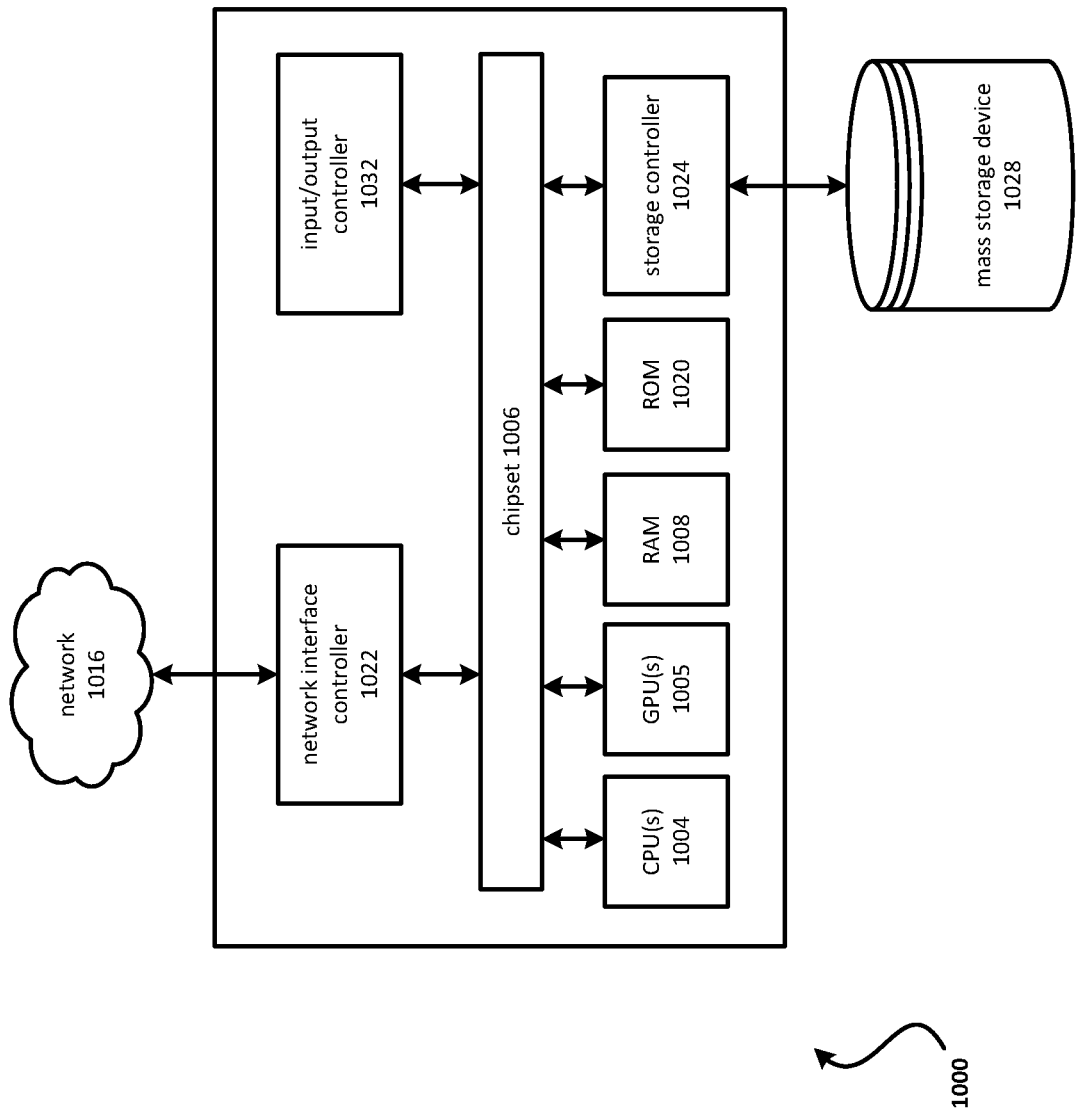
FIG. 10 shows an example computing device which may be used to perform any of the techniques disclosed herein.

FIG. 10 illustrates a computing device that may be used in various aspects, such as the host depicted in FIG. 1. The computer architecture shown in FIG. 10 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1000 may include a baseboard, or "motherboard," which is a printed circuit board to which a multitude of components or devices may be connected by way of a system bus or other electrical communication paths. One or more central processing units (CPUs) 1004 may operate in conjunction with a chipset 1006. The CPU(s) 1004 may be standard programmable processors that perform arithmetic and logical operations necessary for the operation of the computing device 1000.

The CPU(s) 1004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1004 may be augmented with or replaced by other processing units, such as GPU(s) 1005. The GPU(s) 1005 may comprise processing units specialized for but not necessarily limited to highly parallel computations, such as graphics and other visualization-related processing.

A chipset 1006 may provide an interface between the CPU(s) 1004 and the remainder of the components and devices on the baseboard. The chipset 1006 may provide an interface to a random-access memory (RAM) 1008 used as the main memory in the computing device 1000. The chipset 1006 may further provide an interface to a computer-readable storage medium, such as a read-only memory (ROM) 1020 or non-volatile RAM (NVRAM) (not shown), for storing basic routines that may help to start up the computing device 1000 and to transfer information between the various components and devices. ROM 1020 or NVRAM may also store other software components necessary for the operation of the computing device 1000 in accordance with the aspects described herein.

The computing device 1000 may operate in a networked environment using logical connections to remote computing nodes and computer systems through local area network (LAN). The chipset 1006 may include functionality for providing network connectivity through a network interface controller (NIC) 1022, such as a gigabit Ethernet adapter. A NIC 1022 may be capable of connecting the computing device 1000 to other computing nodes over a network 1016. It should be appreciated that multiple NICs 1022 may be present in the computing device 1000, connecting the computing device to other types of networks and remote computer systems.

The computing device 1000 may be connected to a mass storage device 1028 that provides non-volatile storage for the computer. The mass storage device 1028 may store system programs, application programs, other program modules, and data, which have been described in greater detail herein. The mass storage device 1028 may be connected to the computing device 1000 through a storage controller 1024 connected to the chipset 1006. The mass storage device 1028 may consist of one or more physical storage units. The mass storage device 1028 may comprise a management component. A storage controller 1024 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1000 may store data on the mass storage device 1028 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1028 is characterized as primary or secondary storage and the like.

For example, the computing device 1000 may store information to the mass storage device 1028 by issuing instructions through a storage controller 1024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1000 may further read information from the mass storage device 1028 by detecting the physical states or characteristics of one or more particular locations within the physical storage units.

In addition to the mass storage device 1028 described above, the computing device 1000 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1000.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1028 depicted in FIG. 10, may store an operating system utilized to control the operation of the computing device 1000. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1028 may store other system or application programs and data utilized by the computing device 1000.

The mass storage device 1028 or other computer-readable storage media may also be encoded with computer-executable instructions, which, when loaded into the computing device 1000, transforms the computing device from a general-purpose computing system into a special-purpose computer capable of implementing the aspects described herein. These computer-executable instructions transform the computing device 1000 by specifying how the CPU(s) 1004 transition between states, as described above. The computing device 1000 may have access to computer-readable storage media storing computer-executable instructions, which, when executed by the computing device 1000, may perform the methods described herein.

A computing device, such as the computing device 1000 depicted in FIG. 10, may also include an input/output controller 1032 for receiving and processing input from a number of input devices, such as a keyboard, a mouse, a touchpad, a touch screen, an electronic stylus, or other type of input device. Similarly, an input/output controller 1032 may provide output to a display, such as a computer monitor, a flat-panel display, a digital projector, a printer, a plotter, or other type of output device. It will be appreciated that the computing device 1000 may not include all of the components shown in FIG. 10, may include other components that are not explicitly shown in FIG. 10, or may utilize an architecture completely different than that shown in FIG. 10.

As described herein, a computing device may be a physical computing device, such as the computing device 1000 of FIG. 10. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of implementing transparent compression on a block level, comprising:
    creating a first area in a backend solid state drive (SSD), wherein the first area comprises a plurality of entries, wherein the plurality of entries are indexed by addresses of a plurality of blocks of uncompressed data, wherein each of the plurality of entries comprises a first part configured to store metadata and a second part configured to store compressed data, wherein the first part is separate from the second part;
    compressing the plurality blocks of uncompressed data block-by-block at the block level to generate a plurality of compressed blocks, each of the plurality of compressed blocks comprising compressed data;
    storing metadata associated with each of the plurality of compressed blocks in the first part of one of the plurality of entries created in the backend SSD based on an address of a corresponding block of uncompressed data, wherein the corresponding block of uncompressed data is among the plurality of blocks of uncompressed data;
    storing at least a portion of compressed data associated with each of the plurality of compressed blocks in the second part of one of the plurality of entries based on the address of a corresponding block of uncompressed data; and
    returning a completion indicator to a host in response to determining that both metadata and compressed data associated with a compressed block have been stored into the backend SSD, wherein the compressed block is among the plurality of compressed blocks.

2. The method of claim 1, further comprising:
    determining that an entirety of a compressed block is capable of fitting in a corresponding entry based at least in part on a data size of the compressed block, wherein the compressed block is among the plurality of compressed blocks, and the corresponding entry is among the plurality of entries;

storing the entirety of the compressed block in a second part of the corresponding entry; and storing a predetermined indicator in a first part of the corresponding entry, wherein the predetermined indicator indicates that the entirety of the compressed block is stored in the corresponding entry.

3. The method of claim 1, further comprising:

determining that an entirety of a compressed block is not capable of fitting into a corresponding entry, wherein the compressed block is among the plurality of compressed blocks, and the corresponding entry is among the plurality of entries;

storing a portion of the compressed block in a second part of the corresponding entry;

storing a remaining portion of the compressed block in a second area of the SSD, wherein the second area is configured to store compressed data and is different from the first area; and storing mapping information in a first part of the corresponding entry, wherein the mapping information indicates a particular part of the second area where the remaining portion of the compressed block is stored.

4. The method of claim 1, further comprising:

dividing the backend SSD to the first area and a second area, the second area configured to store compressed data; and allocating a predetermined address range of the backend SSD to the first area.

5. The method of claim 1, wherein each of the plurality of entries corresponds to a predetermined storage size.

6. The method of claim 1, further comprising:

identifying an entry among the plurality of entries based on an address of a block of uncompressed data; and determining whether an entirety or only a portion of a compressed block is stored in the entry based on metadata in a first part of the entry, wherein the compressed block corresponds to the block of uncompressed data.

7. The method of claim 6, further comprising:

decompressing the compressed block based on reading data from a second part of the entry in response to determining that the entirety of the compressed block is stored in the entry.

8. The method of claim 6, further comprising:

obtaining mapping information from the first part of the entry in response to determining that only the portion of the compressed block is stored in the entry, wherein the mapping information indicates a particular part of a second area of the SSD in which a remaining portion of the compressed block is stored, the second area configured to store compressed data;

reading the remaining portion of the compressed block from the second area based on the mapping information; and decompressing the compressed block based on the portion from a second part of the entry and the remaining portion from the second area.

9. The method of claim 1, wherein the method is applied to an instance storage.

10. A system, comprising:

at least one processor; and at least one memory comprising computer-readable instructions that upon execution by the at least one processor cause the computing device to perform operations comprising:

creating a first area in a backend solid state drive (SSD), wherein the first area comprises a plurality of entries, wherein the plurality of entries are indexed by addresses of a plurality of blocks of uncompressed data, wherein each of the plurality of entries comprises a first part configured to store metadata and a second part configured to store compressed data, wherein the first part is separate from the second part;

compressing the plurality blocks of uncompressed data block-by-block at a block level to generate a plurality of compressed blocks, each of the plurality of compressed blocks comprising compressed data;

storing metadata associated with each of the plurality of compressed blocks in the first part of one of the plurality of entries created in the backend SSD based on an address of a corresponding block of uncompressed data, wherein the corresponding block of uncompressed data is among the plurality of blocks of uncompressed data;

storing at least a portion of compressed data associated with each of the plurality of compressed blocks in the second part of one of the plurality of entries based on the address of a corresponding block of uncompressed data; and returning a completion indicator to a host in response to determining that both metadata and compressed data associated with a compressed block have been stored into the backend SSD, wherein the compressed block is among the plurality of compressed blocks.

11. The system of claim 10, the operations further comprising:

determining that an entirety of a compressed block is capable of fitting in a corresponding entry based at least in part on a data size of the compressed block, wherein the compressed block is among the plurality of compressed blocks, and the corresponding entry is among the plurality of entries;

storing the entirety of the compressed block in a second part of the corresponding entry; and storing a predetermined indicator in a first part of the corresponding entry, wherein the predetermined indicator indicates that the entirety of the compressed block is stored in the corresponding entry.

12. The system of claim 10, the operations further comprising:

determining that an entirety of a compressed block is not capable of fitting into a corresponding entry, wherein the compressed block is among the plurality of compressed blocks, and the corresponding entry is among the plurality of entries;

storing a portion of the compressed block in a second part of the corresponding entry;

storing a remaining portion of the compressed block in a second area of the SSD, wherein the second area is configured to store compressed data and is different from the first area; and storing mapping information in a first part of the corresponding entry, wherein the mapping information indicates a particular part of the second area where the remaining portion of the compressed block is stored.

13. The system of claim 10, the operations further comprising:
dividing the backend SSD to the first area and a second area, the second area configured to store compressed data; and
allocating a predetermined address range of the backend SSD to the first area.

14. The system of claim 10, the operations further comprising:
identifying an entry among the plurality of entries based on an address of a block of uncompressed data; and
determining whether an entirety or only a portion of a compressed block is stored in the entry based on metadata in a first part of the entry, wherein the compressed block corresponds to the block of uncompressed data.

15. The system of claim 14, the operations further comprising:
in response to determining that the entirety of the compressed block is stored in the entry, decompressing the compressed block based on reading data from a second part of the entry; or
in response to determining that only the portion of the compressed block is stored in the entry, obtaining mapping information from the first part of the entry, reading the remaining portion of the compressed block from the second area based on the mapping information, and decompressing the compressed block based on the portion from a second part of the entry and the remaining portion from the second area, wherein the mapping information indicates a particular part of a second area of the SSD in which a remaining portion of the compressed block is stored, the second area configured to store compressed data.

16. A non-transitory computer-readable storage medium, storing computer-readable instructions that upon execution by a processor cause the processor to implement operations, the operation comprising:
creating a first area in a backend solid state drive (SSD), wherein the first area comprises a plurality of entries, wherein the plurality of entries are indexed by addresses of a plurality of blocks of uncompressed data, wherein each of the plurality of entries comprises a first part configured to store metadata and a second part configured to store compressed data, wherein the first part is separate from the second part;
compressing the plurality blocks of uncompressed data block-by-block at a block level to generate a plurality of compressed blocks, each of the plurality of compressed blocks comprising compressed data;
storing metadata associated with each of the plurality of compressed blocks in the first part of one of the plurality of entries created in the backend SSD based on an address of a corresponding block of uncompressed data, wherein the corresponding block of uncompressed data is among the plurality of blocks of uncompressed data;
storing at least a portion of compressed data associated with each of the plurality of compressed blocks in the second part of one of the plurality of entries based on the address of a corresponding block of uncompressed data; and
returning a completion indicator to a host in response to determining that both metadata and compressed data associated with a compressed block have been stored into the backend SSD, wherein the compressed block is among the plurality of compressed blocks.

17. The non-transitory computer-readable storage medium of claim 16, the operations further comprising:
determining that an entirety of a compressed block is capable of fitting in a corresponding entry based at least in part on a data size of the compressed block, wherein the compressed block is among the plurality of compressed blocks, and the corresponding entry is among the plurality of entries;
storing the entirety of the compressed block in a second part of the corresponding entry; and
storing a predetermined indicator in a first part of the corresponding entry, wherein the predetermined indicator indicates that the entirety of the compressed block is stored in the corresponding entry.

18. The non-transitory computer-readable storage medium of claim 16, the operations further comprising:
determining that an entirety of a compressed block is not capable of fitting into a corresponding entry, wherein the compressed block is among the plurality of compressed blocks, and the corresponding entry is among the plurality of entries;
storing a portion of the compressed block in a second part of the corresponding entry;
storing a remaining portion of the compressed block in a second area of the SSD, wherein the second area is configured to store compressed data and is different from the first area; and
storing mapping information in a first part of the corresponding entry, wherein the mapping information indicates a particular part of the second area where the remaining portion of the compressed block is stored.

* * * * *